United States Patent [19]

Stegelman et al.

[11] Patent Number: 4,988,287

[45] Date of Patent: Jan. 29, 1991

[54] COMBUSTION APPARATUS AND METHOD

[75] Inventors: Albert F. Stegelman; David F. Bichler, both of Borger, Tex.

[73] Assignee: Phillips Petroleum Company, Bartlesville, Okla.

[21] Appl. No.: 368,634

[22] Filed: Jun. 20, 1989

[51] Int. Cl.$^5$ .............................................. F23Q 9/00
[52] U.S. Cl. ..................................... 431/284; 431/5; 431/186; 431/189; 431/351
[58] Field of Search .............. 431/284, 189, 186, 351, 431/160, 5

[56] References Cited

U.S. PATENT DOCUMENTS

| | | | |
|---|---|---|---|
| 2,497,095 | 2/1950 | Nevins et al. | 23/225 |
| 2,518,937 | 8/1950 | Roberts | 188/76 |
| 3,483,700 | 12/1969 | Ryberg et al. | 60/39 |
| 3,563,470 | 2/1971 | Susuki | 239/402 |
| 3,663,153 | 5/1972 | Bagge et al. | 431/351 |
| 3,782,884 | 1/1974 | Shumaker | 431/186 |
| 3,915,621 | 10/1975 | Iverson | 431/189 |
| 3,960,504 | 6/1976 | Griffin | 23/277 C |
| 3,963,433 | 6/1976 | Bond et al. | 23/262 |
| 4,035,158 | 6/1977 | Scott et al. | 23/278 |
| 4,088,744 | 5/1978 | Reed et al. | 423/573 G |
| 4,391,790 | 7/1983 | Palm et al. | 423/574 R |
| 4,394,119 | 7/1983 | Waller et al. | 431/5 |
| 4,395,390 | 7/1983 | Desgrandchamps et al. | 423/573 G |
| 4,473,350 | 9/1984 | Gitman | 431/160 |
| 4,479,810 | 10/1984 | Marion et al. | 48/86 R |
| 4,596,699 | 6/1986 | Desgrandchamps et al. | 422/160 |

OTHER PUBLICATIONS

Reed, R. J., ed., *North American Combustion Handbook*, North American Mfg. Co., 05/1978, pp. 238, 239, 256, 257, 260, and 261.

Lieberman, *Troubleshooting Refinery Processes*, Tulsa, Okla., Pennwell Publ., 6/1981 pp. 82-74.

Primary Examiner—Larry Jones
Attorney, Agent, or Firm—William R. Sharp

[57] ABSTRACT

A combustion apparatus and method are provided which can achieve highly effective and complete combustion of combustible gases therein. In accordance with the invention, a stream of oxidant gas is directed along and in contact with the exterior surface of a hollow member having inlets communicating with the interior thereof. The oxidant gas is then directed through the inlets into the interior of the hollow member. Oxidant gas swirl vanes are provided within the hollow member to impart swirling motion to the oxidant gas. A nozzle extends into the hollow member and also contains swirl vanes which impart a swirling motion to at least one combustible gas which is passed through the nozzle. Swirling combustible gas exiting the nozzle outlet mixes with the swirling stream of oxidant gas to produce a combustible mixture. The combustible gas in such mixture is combusted and combustion products are discharged through an outlet of the hollow member. Enhanced combustion is achieved by achieving a highly turbulent flow of oxidant gas and combustible gas and by preheating the oxidant gas prior to entry into the hollow member by means of directing the oxidant gas over the exterior surface of the hollow member.

27 Claims, 3 Drawing Sheets

COMBUSTION APPARATUS AND METHOD

BACKGROUND OF THE INVENTION

This invention relates to a combustion apparatus and method which is particularly effective at combusting ammonia in ammonia containing streams which are produced by certain oil refinery processes.

It is typical in a refinery to utilize a desulfurization unit to hydrotreat an oil stream to remove sulfur therefrom. Hydrogen reacts with sulfur in the oil stream to produce hydrogen sulfide ($H_2S$) and also reacts with nitrogen in the oil stream to produce ammonia ($NH_3$). Therefore, the product gas stream produced by the desulfurization unit includes hydrogen sulfide as well as ammonia. Removal of a substantial amount of the hydrogen sulfide and ammonia is required by stringent pollution laws. It is also economically desirable to remove the hydrogen sulfide in order to recover sulfur therefrom.

In order to remove such hydrogen sulfide and ammonia from the product gas stream as produced by the desulfurization unit, the product gas stream is first water washed to absorb some of the hydrogen sulfide and most of the ammonia. The resulting "sour" water is passed through a water stripper to thereby produce a sour gas containing ammonia, hydrogen sulfide and water vapor. After water washing of the product gas stream, the product gas stream is then treated with amine to absorb the remainder of the hydrogen sulfide. An amine stripper is utilized to strip the amine to leave an "acid" gas containing primarily hydrogen sulfide.

It is well known to recover sulfur from hydrogen sulfide containing gases such as acid gas and sour gas. The most typical process employed is called the "Claus" reaction wherein only a portion of the hydrogen sulfide is burned to yield a mixture of sulfur dioxide, water vapor and the remaining unburned hydrogen sulfide. This mixture is then cooled to cause the reaction of the remaining hydrogen sulfide and $SO_2$ and consequent formation of sulfur. Any unreacted hydrogen sulfide and sulfur dioxide is passed over a bauxite catalyst to complete the sulfur recovery process.

Although prior processes have been effective at decomposing hydrogen sulfide and recovering sulfur, efforts at decomposing the ammonia from sour gas in the combustion step of such processes have not been particularly effective. A substantial amount of ammonia, as noted previously, must be removed to meet pollution standards. In addition, any remaining ammonia in the output stream of the combustion furnace, even if meeting pollution standards, can be corrosive to equipment used downstream in the sulfur recovery process. Therefore, it is particularly desirable to maximize the removal of ammonia from sour gas streams.

SUMMARY OF THE INVENTION

It is, therefore, an object of the invention to provide a combustion apparatus and method which are capable of effectively combusting both hydrogen sulfide and ammonia in a combination of acid and sour gas streams.

The above object is realized by an apparatus comprising: a hollow member having a longitudinally axis, an interior surface, an exterior surface, at least one inlet which communicates with the interior of the hollow member, and an outlet which communicates with the interior of the hollow member and which is longitudinally spaced from the inlet; a nozzle having an exterior surface, an outlet and at least one combustible gas swirl vane mounted within the nozzle, wherein the nozzle extends into the interior of the hollow member such that the nozzle outlet is longitudinally positioned between the hollow member inlet and the hollow member outlet and such that a passageway is defined through the hollow member having a first zone defined by the exterior surface of the nozzle and the interior surface of a first portion of the hollow member longitudinally extending between the hollow member inlet and the nozzle outlet, and wherein the passageway further comprises a second zone defined by the interior surface of a second portion of the hollow member longitudinally extending between the nozzle outlet and the hollow member outlet; at least one oxidant gas swirl vane fixedly mounted within the first zone; a first directing means for directing an oxidant gas stream in a direction generally toward the hollow member inlet so as to flow along and in contact with at least a portion of the exterior surface of the second portion of the hollow member and then along and in contact with at least a portion of the exterior surface of the first portion of the hollow member; a second directing means for directing the entirety of the oxidant gas stream through the hollow member inlet and into the first zone so as to flow, in a direction generally toward the second zone, around and in contact with the oxidant gas swirl vane(s) to thereby produce a swirling stream of oxidant gas; means for passing at least one stream of at least one combustible gas through the nozzle so to flow around and in contact with the combustible gas swirl vane(s), whereby at least one swirling stream of at least one combustible gas exits the nozzle outlet into the second zone so as to contact and mix with the swirling stream of oxidant gas in the second zone.

According to another aspect of the invention, there is provided a method of using the above described apparatus involving a series of steps resulting in a mixture of at least one combustible gas and oxidant gas in the second zone, and wherein the method further comprises the steps of combusting the combustible gas in the second zone to produce combustion products, and discharging the combustion products through the hollow member outlet.

According to a preferred embodiment of the invention, the above described apparatus and method can be applied to an acid gas stream and also a sour gas stream so as to mix these streams with the oxidant gas in the second zone. The hydrogen sulfide and in particular the ammonia can be effectively combusted in the second zone which longitudinally extends between the nozzle outlet and the hollow member outlet. Also according to a preferred embodiment of the invention, the nozzle can comprise concentric tubular members through which the sour gas and acid gas respectively flow. A fuel gas tube extending through the nozzle can be provided for the purpose of preheating the apparatus or melting out deposits in the apparatus.

An apparatus operated in accordance with the method steps of the invention can result in virtually complete combustion of the ammonia as well as the hydrogen sulfide from the respective sour and acid gas streams. Such effective combustion of the ammonia in particular can be attributed to the cooperation of several advantageous features of the invention. First, the oxidant gas is directed along exterior surfaces of first and second portions of the first hollow member which surround first and second zones which make up a passageway within the hollow member. Note that combustion takes place in the second zone so as to convey heat through the exterior surface of the hollow member to oxidant gas flowing along and in contact therewith. A considerable amount of heat is also conveyed through the exterior surface of the hollow member from the first zone to oxidant gas flowing along and in contact with the exterior surface of the hollow member. Therefore, such flow of the oxidant gas along the exterior surface of the hollow member preheats the oxidant gas prior to being directed through the inlet(s) of the hollow member. Such preheated oxidant gas enhances combustion. Additionally, preheating of the oxidant gas in this manner cools the hollow member and any refractory lining the interior surface of the hollow member, thus reducing necessary refractory thickness. Second, the combination of oxidant gas vane(s) and combustible gas vane(s) produce swirling, turbulent streams of oxidant gas and combustible gas upon entering the second zone. Such turbulence produces excellent mixing of the combustible gas and oxidant gas in the second zone to further enhance combustion.

DETAILED DESCRIPTION OF THE INVENTION

A preferred embodiment of the invention will now be described with respect to the FIGURES. Although the invention is described as using both an acid gas and sour gas, it should be understood that the invention, in accordance with certain broad aspects thereof, could be used with any combustible gas to achieve highly effective combustion.

Figure 1:
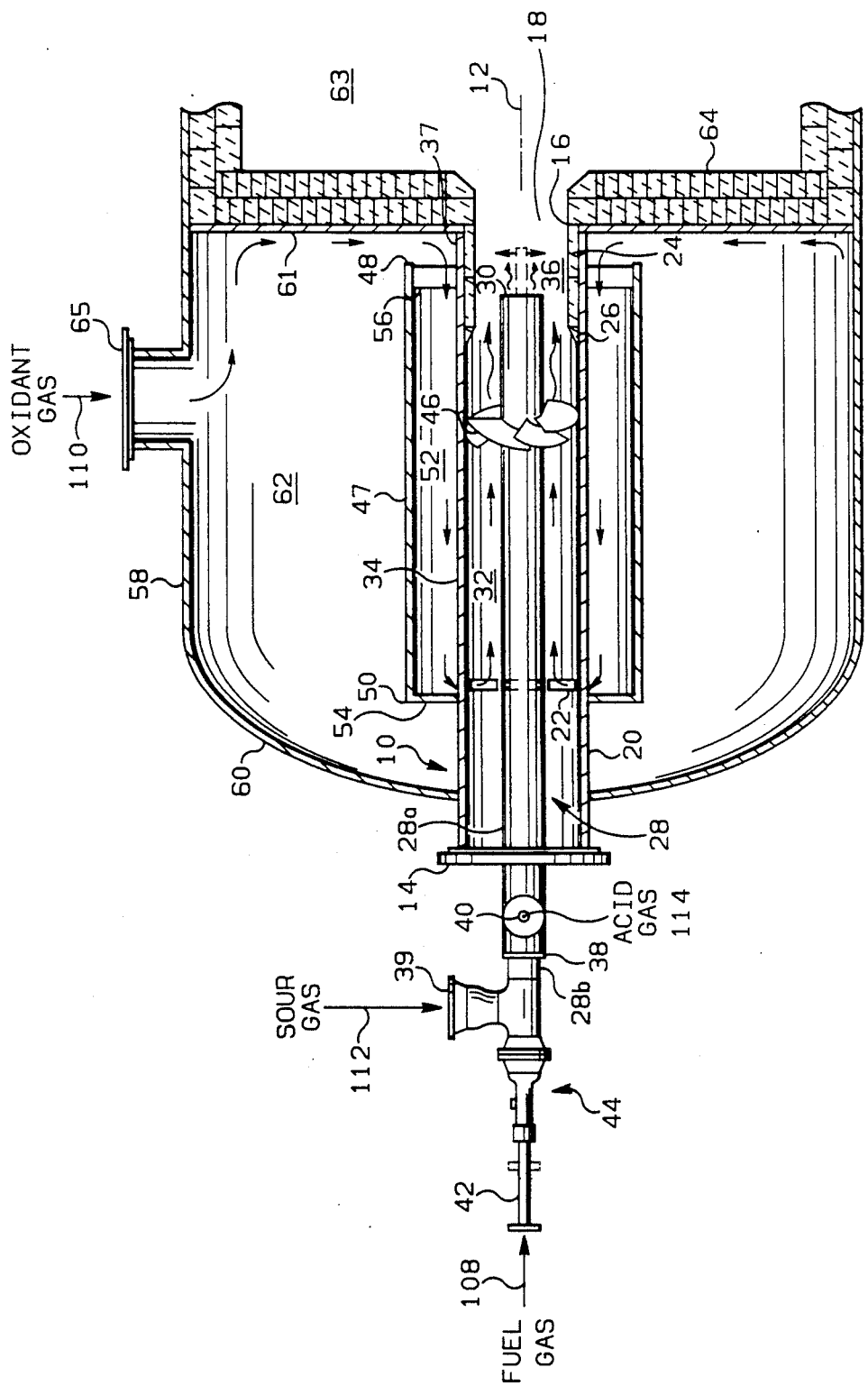
FIG. 1 is a partial cross-sectional view of one embodiment of an apparatus in accordance with the invention, wherein the apparatus includes a combustible gas nozzle and associated pipe fitting assembly and also a fuel gas tube which extends through the pipe fitting assembly and into and through the combustible gas nozzle.

Referring to FIG. 1 the illustrated apparatus includes a hollow member 10 which in the illustrated embodiment is a generally cylindrical, elongated member which will hereinafter be called a burner tube. Burner tube 10, preferably composed of carbon steel, has a longitudinal axis 12, a closed upstream end 14, and an open downstream end 16 which defines an outlet 18 which communicates with the interior of burner tube 10. Burner tube 10 further includes sidewall 20 which longitudinally extends between upstream end 14 and downstream end 16 and which has an exterior surface and interior surface. A plurality of inlets 22 are provided through sidewall 20 so as to be circumferentially spaced around hollow member 10 and so as to communicate with the interior of burner tube 10 and so as to be longitudinally spaced from outlet 18. The interior surface of sidewall 20 is considered to include the interior surfaces of refractory bricks as indicated at 24 and wedge-shaped refractory members as indicated at 26, which are positioned near downstream end 16 in a manner which will be discussed further below.

The apparatus of FIG. 1 further comprises a nozzle 28 which extends through closed upstream end 14 and into the interior of burner tube 10 along longitudinal axis 12 to a nozzle outlet 30. As shown, nozzle outlet 30 is longitudinally positioned between burner tube inlets 22 and burner tube outlet 18. Extension of nozzle 28 into burner tube 10 defines a passageway through burner tube 10 which has a first zone 32, which in the illustrated embodiment is a generally annular space, defined by the exterior surface of nozzle 28 and the interior surface of a first portion 34 of burner tube 10 which longitudinally extends between burner tube inlets 22 and nozzle outlet 30. This passageway through burner tube 10 further comprises a second zone 36 defined by the interior surface of a second portion 37 of burner tube 10 which longitudinally extends between nozzle outlet 30 and burner tube outlet 18.

Nozzle 28 includes a first tubular member 28a and a second tubular member 28b positioned generally coaxially within tubular member 28a so as to extend therethrough. As shown, tubular member 28b is sealed to tubular member 28a by a flat, generally annular plate 38 mounted on the end of tubular member 28a. The internal structure of nozzle 28 will be discussed further below with respect to FIGS. 2 and 3. A sour gas inlet 39 is provided so as to communicate with the interior of tubular member 28b, and an acid gas inlet 40 is provided so as to communicate with interior of tubular member 28a. A fuel gas tube as indicated at 42 is received through a pipe fitting assembly 44, which will be further discussed with respect to FIG. 4, and also through tubular member 28b. Fuel gas tube 42 is for receiving fuel gas therethrough for preheating the apparatus or melting out deposits within the apparatus following operation thereof.

A plurality of oxidant gas vanes 46, preferably composed of carbon steel, are fixedly mounted at their inner edges to the exterior surface of nozzle 28 so as to be positioned within zone 32. Therefore, inlets 22 are longitudinally positioned between upstream end 14 and oxidant gas vanes 46. As shown, oxidant gas vanes 46 are circumferentially spaced around the generally annular space defined by zone 32 such that each oxidant gas swirl vane 46 circumferentially overlaps an adjacent oxidant gas swirl vane. Preferably, each oxidant gas swirl vane is flat such that the opposing surfaces of each vane lie in single planes. It is further preferable that each oxidant gas swirl vane is pitched with respect to longitudinal axis 12 such that the axis (being perpendicular to the opposing planar surfaces) of each vane defines an acute angle with longitudinal axis 12. The acute angle, which can be denoted as a "pitch" angle, defined between the axis of each oxidant gas swirl vane 46 and longitudinal axis 12 is preferably in the range of about 30° to about 60°. Finally, each oxidant gas swirl vane 46 preferably extends from an inner edge at the exterior surface of nozzle 28 to an outer edge closely adjacent to, or contacting, the interior surface of burner tube 10.

The structure and positioning of oxidant gas swirl vanes 46 is adapted to impart a clockwise rotational direction (when viewed from a position facing upstream end 14) to oxidant gas flowing through zone 32. Furthermore, the circumferential overlap of the swirl vanes is particularly advantageous insofar as no oxidant gas is permitted to flow straight through the vanes but is instead forced to follow the surfaces of the vanes so as to rotate in the above-mentioned direction.

As noted previously, the interior surfaces of refractory bricks 24 and refractory members 26 are considered to form a portion of the interior surface of burner tube 10. Such refractory bricks 24 and refractory members 26 are positioned as shown such that, at a position longitudinally between the oxidant gas swirl vane 46 and the nozzle outlet 30, the first zone 32 converges in a downstream direction from a first cross sectional flow area to a second cross sectional flow area smaller than the first flow area. The smaller cross sectional flow area is maintained throughout the second zone 36. Refractory bricks 24 are preferably composed of a high alumina content (i.e. at least 90%) refractory material such as Greenal 90. Wedge-shaped refractory members 26 are preferably composed of a high alumina content, castable refractory material such as Greencast 94GR. Such refractory material as recited above are capable of withstanding temperature of at least 3000° F.

The apparatus of FIG. 1 further comprises a hollow member 47 which in the illustrated embodiment is generally cylindrical in shape and which will hereinafter be referred to as a shell. Shell 47 longitudinally extends from a first open end 48, which is longitudinally positioned between nozzle outlet 30 and burner tube outlet 18, to a second end 50, which is longitudinally positioned between upstream end 14 and inlets 22. Shell 47, as shown surrounds burner tube 10 such that the interior surface of shell 47 and the exterior surface of burner tube 10 define therebetween a generally annular space 52 which communicates with inlets 22. A generally annular end wall 54 is also provided which closes annular space 52 at end 50. A plurality of circumferentially spaced supports 56 (only two of which are shown) are shown as being connected between the interior surface of shell 47, near open end 48, and the exterior surface of burner tube 10. The sole purpose of supports 56 is to support open end 48 at a position spaced from the exterior surface of burner tube 10.

Another hollow member is indicated at 58, which in the illustrated embodiment is generally cylinderical in shape and will hereinafter be denoted as a vessel. Vessel 58 has a closed end 60 which is longitudinally positioned between upstream end 14 of burner tube 10 and second end 50 of shell 47, and extends from closed end 60 downstream, with respect to burner tube 10, from downstream end 16 of burner tube 10. As shown, burner tube 10 extends through the interior of vessel 58 to downstream end 16. A partition wall 61 divides the interior of vessel 58 into a first chamber 62, which surrounds burner tube 10 and shell 47, and a second chamber 63. Partition wall 61 is further connected to burner tube 10 at its downstream end 16 such that outlet 18 of burner tube 10 communicates with chamber 63 through an opening in partition wall 61. Refractory members as indicated at 64 are provided along partition wall 61. Such refractory members 64 can be composed of a suitable high alumina content refractory material as was previously discussed. Vessel 58 is further provided with an oxidant gas inlet 65 which communicates with chamber 62.

Figure 2:
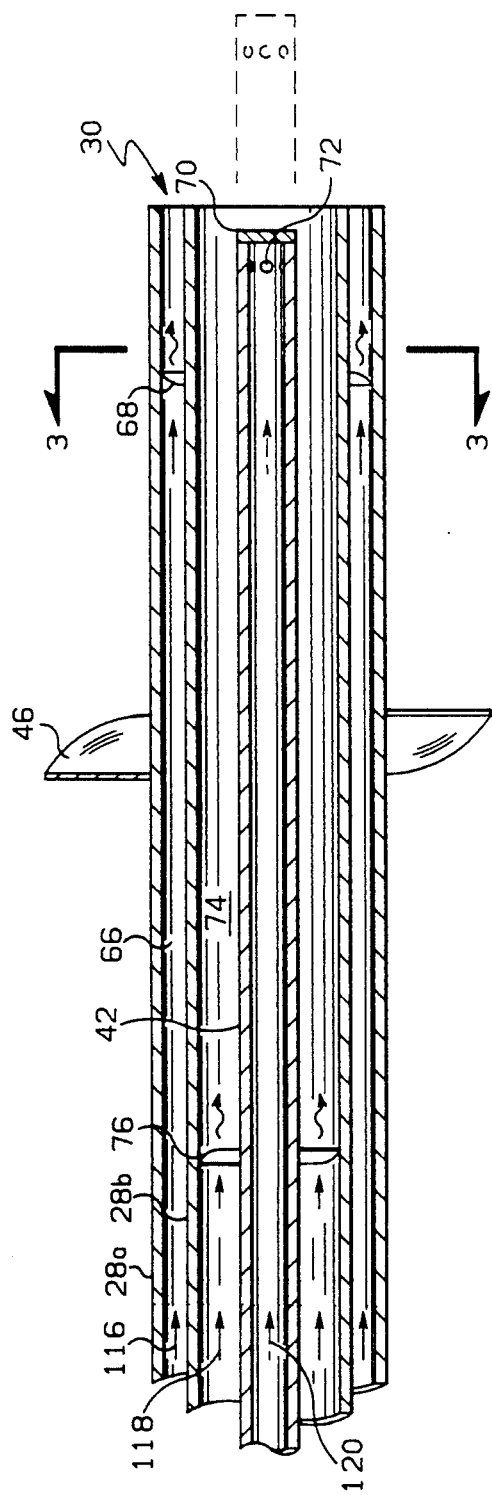
FIG. 2 is an enlarged, cross-sectional view of a portion of the combustible gas nozzle.

Referring now to FIG. 2, the nozzle 28 and associated fuel gas tube 42 will now be more specifically described. Nozzle 28 includes tubular member 28a, having oxidant gas swirl vanes 46 extending therefrom, and tubular member 28b generally coaxially positioned within tubular member 28a so as to define a generally annular space 66 therebetween. A plurality of acid gas swirl vanes, preferably composed of carbon steel, are connected at their inner edges to the exterior surface of tubular member 28b so as to be circumferentially spaced around annular space 66. Acid gas swirl vanes 68 are similar in structure to oxidant gas swirl vanes 46 insofar as each of vanes 68 circumferentially overlaps an adjacent vane and insofar as the opposing surfaces of each vane 68 define planes which are perpendicular to longitudinal axis 12, and thus also the longitudinal axis of nozzle 28. However, acid gas vanes 68 are pitched oppositely to oxidant gas vanes 46 so as to be adapted to impart a swirling motion to acid gas flowing through annular space 66 in a rotational direction opposite to that rotational direction imparted to oxidant gas by oxidant gas swirl vanes 46. The pitch angle of each acid gas vane is preferably in the range of about 30° to about 60°.

Fuel gas tube 42, having a closed end 70 and a plurality of circumferentially spaced outlet openings 72 near end 70, extends into and through the interior of tubular member 28b so as to be coaxially positioned therein and so as to define a generally annular space 74 therebetween. As will be explained further with respect to FIGS. 1 and 4, fuel gas tube 42 is selectively positionable between a retracted position in which end 70 and outlet openings 72 are positioned within tubular member 28b, and an extended position (shown by dashed lines) in which end 70 and outlet openings 72 are positioned externally to tubular member 28b and beyond nozzle outlet 30. A plurality of sour gas vanes 76 are mounted at their inner edges to the exterior surface of fuel gas tube 42 so as to be circumferentially spaced around annular space 74. Sour gas vanes 76, also preferably composed of carbon steel, are substantially similar in structure and orientation to oxidant gas vanes 46, and are adapted to impart a swirling motion to sour gas flowing through annular space 74 in a rotational direction opposite to that rotational direction imparted to acid gas flowing around and in contact with acid gas vanes 68. The preferred pitch angle for sour gas vanes 76 is also in the range of about 30° to about 60°. In regard to the selective positioning capability of fuel gas tube 42, sufficient clearance should be provided between the outer edges of sour gas vanes 76 and the interior surface of tubular member 28b to allow freely slidable motion of fuel gas tube 42 within tubular member 28b.

In the illustrated embodiment, oxidant gas swirl vanes 46 are shown as being longitudinally positioned between acid gas vanes 68 and sour gas vanes 76. However, the relative positioning of the vanes is not particularly critical. Only two opposing vanes of each set of vanes is shown in FIG. 2 for clarity of illustration.

With regard to the preferred materials for use in tubular members 28a and 28b and fuel gas tube 42, carbon steel is generally preferred except for end portions thereof, which are exposed to the very high temperatures generated by combustion within zone 36. Such end portions of such tubular members and fuel gas tube 42 can be made of stainless steel instead of carbon steel.

Figure 3:
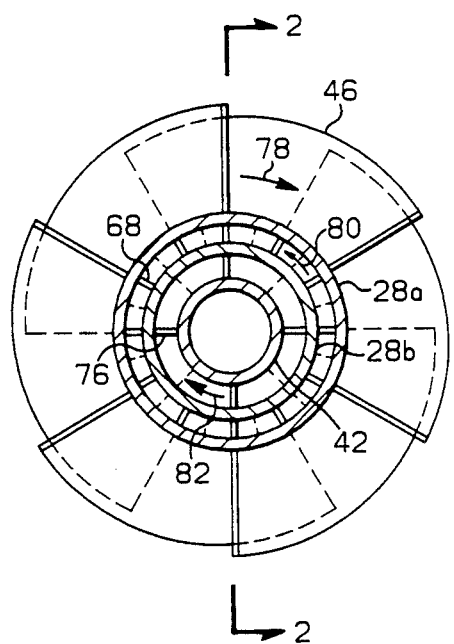
FIG. 3 is a cross-sectional view of the nozzle of FIG. 2 as viewed along line 3—3.

Referring now to FIG. 3, another cross-sectional view of nozzle 28 is shown which more clearly illustrates the relative positioning of the various vanes. With respect to oxidant gas swirl vanes 46 for example, dashed lines indicate those portions of the oxidant gas vanes 46 which are behind adjacent vanes. This clearly shows the manner in which each oxidant gas swirl vane 46 circumferentially overlaps an adjacent vane. The advantages of this feature have been discussed previously. Moreover, it should be noted that since each oxidant gas swirl vane 46 is pitched at an angle with respect to the longitudinal axis 12 of burner tube 10, portions of the oxidant gas swirl vanes appears foreshortened. Circumferential overlapping of acid gas vanes 68 and sour gas vanes 76 are shown in a similar manner utilizing dashed lines. The apparent foreshortening of portions of the acid gas vanes 68 and sour gas vanes 76 are not shown for ease of illustration. The rotational direction imparted to gases flowing around and in contact with respective swirl vanes are shown by arrows 78, 80 and 82. With respect to the number of swirl vanes employed, it may be noted that different numbers of swirl vanes are used in the illustrated embodiment for each respective gas. It has been found that as velocity of a gas increases, more vanes are needed to achieve the same desired swirling motion. In the illustrated embodiment, the acid gas stream is assumed to have the highest flow velocity. Thus, more acid gas swirl vanes 68 are employed than either of the oxidant gas swirl vanes 46 or acid gas swirl vanes 72.

Figure 4:
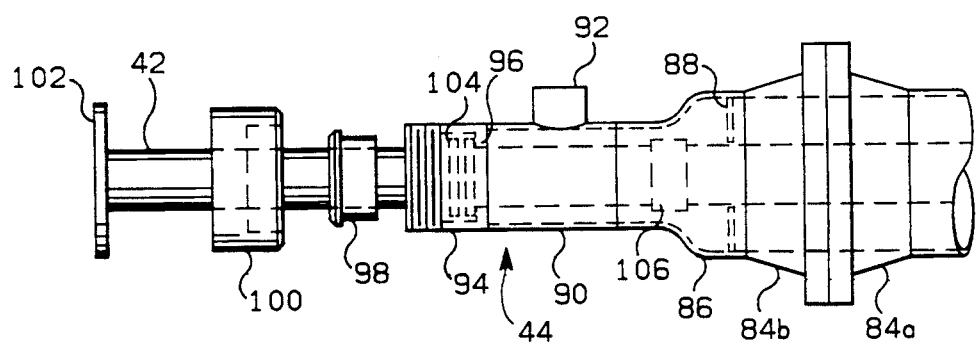
FIG. 4 is a partially disassembled view of the above-mentioned pipe fitting assembly which permits selective positioning of the fuel gas tube.

Referring to FIG. 4, there is shown a partially disassembled view of pipe fitting assembly 44. Pipe fitting assembly 44 comprises a pair of flange members 84a and 84b; a swage, or reducer, 86 which has a generally annular plate 88 welded to its interior surface at the larger end; a pipe 90 having a purge inlet 92 as will be discussed further below; a body 94 which has a generally annular protrusion 96 at one end; a packing gland 98; and a cap 100. As shown, fuel gas tube 42, having a flange 102 at its upstream end, is received through each of the elements of the pipe fitting assembly 44. To effect a seal around fuel gas tube 42, cap 100 is screwed upon the threaded end of body 94 so as to urge packing gland 98 against packing rings 104. Packing rings 104 can be of any suitable material for effecting a gas tight seal, such as graphite coated Teflon ®. Accordingly, packing rings 104 are squeezed between packing gland 98 and annular protrusion 96 so as to expand packing rings 104 into sealing engagement with the exterior surface of fuel gas tube 42 and the interior surface of body 94. A suitable purge gas, such as air or nitrogen, can be introduced through purge inlet 92 for purging the area around packing rings 104 of potentially corrosive sour gas.

Fuel gas tube 42 has a stop ring 106 fixedly connected thereto as shown. This stop ring enables selective positioning of fuel gas tube 42 between retracted and extended positions as has been discussed with respect to FIG. 2 and as will be further discussed below in connection with FIG. 1. Before changing the position of fuel gas tube 42, it is desirable to loosen cap 100 from body 94 as shown so as to loosen packing rings 104 and enable easy sliding movement of fuel gas tube 42 through pipe fitting assembly 44. To place fuel gas tube in the extended position, the fuel gas tube is manually pushed forward such that stop ring 106 abuts plate 88. To place fuel gas tube 42 in its retracted position, the fuel gas tube is simply pulled back in the reverse direction such that stop ring 106 abuts annular protrusion 96. Therefore, the pipe fitting assembly 44 as illustrated enables simple and easily implemented retraction from and extension into zone 36 (see FIG. 1).

Operation of the above described apparatus in accordance with a preferred embodiment of the invention will now be described with reference to FIG. 1.

In order to preheat the refractory material within burner tube 10 and within chamber 63, fuel gas tube 42 is positioned in its extended position as shown by the dashed lines in FIG. 1. In the extended position, the outlet openings and end of the fuel gas tube 42 are positioned within zone 36. A suitable fuel gas, such as natural gas, methane, propane or hydrogen, is passed into and through fuel gas tube as indicated at 108. The fuel gas accordingly exits the outlets of the fuel gas tube 42 so as to flow into zone 36 as indicated by arrows. The fuel gas is combusted with a suitable supply of oxidant gas, such as for example by means of oxidant gas inlet 65, shell 47 and burner tube inlets 22, as will be discussed further below with respect to combustion of the sour gas and acid gas. Preferably, the fuel gas is introduced into zone 36 at a high velocity, about 1000 to about 2000 feet per second, in a direction generally perpendicular to longitudinal axis 12 and generally perpendicular to oxidant gas flowing through burner tube 10 in a direction generally parallel to longitudinal axis 12. This greatly enhances mixing of fuel gas and oxidant gas and promotes complete combustion of a stoichiometric mixture of fuel gas and oxidant gas.

The flow rate of the fuel gas is gradually increased so as to increase the temperature in zone 36 at a rate of about 200° F. per hour. Such a slow preheating process is necessary to bring the refractory materials to a temperature near operating temperature while avoiding cracking of the refractory material. Incremental increases in the fuel gas flow rate are continued until temperature conditions within zone 36 are within 200° to about 500° F. of the normal operating temperature within zone 36.

Such a preheating step avoids thermal shock and possible damage to the refractory materials upon initiating the combustion of the sour gas and acid gas. Furthermore, preheating of the refractory material ensures that hot gases flowing along and in contact with surfaces of such refractory materials in zone 36 and in chamber 63 do not lose an appreciable amount of heat through the refractory materials and to the exterior of the apparatus. Thus, the temperature of hot gases flowing through zone 36 and chamber 63 is substantially maintained at a constant level.

After completion of the preheating step, the fuel gas tube 42 is accordingly retracted such that the end of the fuel gas tube is positioned within tubular member 28b of nozzle 28. Retraction of the fuel gas tube from zone 36 in this manner is desirable to avoid possible damage to the end of fuel gas tube 42 during combustion of sour gas and acid gas in zone 36.

To establish a flow of oxidant gas through burner tube 10, a supply of a suitable oxidant gas, such as air, is blown through oxidant gas inlet 65 by, for example, a fan at a pressure of about 20 psig. This pressure is slightly above the operating pressure within burner tube 10 which is at about 8 to about 12 psig. Accordingly, oxidant gas is passed into and through inlet 65 as indicated at 110. The interior surface of vessel 58, partition wall 61 and open end 48 of shell 47 cooperate to direct a flow of oxidant gas along and in contact with the surface of partition wall 61 which faces chamber 62. A series of arrows indicate a possible flow path of the oxidant gas.

After flowing along the surface of the partition wall 61, the oxidant gas flows through open end 48 of shell 47 and through annular space 52 in a generally stream around burner tube 10. The oxidant gas is accordingly directed by shell 47 in a direction generally toward inlets 22 so as to flow along and in contact with at least a portion of the exterior surface of second portion 37 of burner tube 10, which longitudinally extends between nozzle outlet 30 and burner tube outlet 18. The oxidant gas is further directed along and in contact with the exterior surface of the first portion 34 of burner tube 10, which longitudinally extends between inlets 22 and nozzle outlet 30.

By directing the flow of oxidant gas along and in contact with surfaces of partition wall 61 and burner tube 10, this serves to preheat the oxidant gas before entering the burner tube so as to enhance combustion therein. Such preheating of the oxidant gas is particularly pronounced along the exterior surface of second portion 37 of burner tube 10 since this portion of burner tube 10 surrounds zone 36 in which combustion occurs. The sidewall which comprises second portion 37 typically reaches temperatures exceeding 1000° F. In addition, directing flow of oxidant gases along the above mentioned surfaces also serves to cool such surfaces and thereby reduces necessary refractory thicknesses around zone 36 and chamber 63. Such a cooling effect also reduces the temperature of such elements as the burner tube 10 and shell 47 to an extent which permits use of carbon steel instead of more expensive stainless steel.

The entirety of the oxidant gas stream flowing through annular space 52 is directed by end wall 54 to flow through inlets 22 and into zone 32 within burner tube 10. The oxidant gas stream is directed by upstream end 14 to flow in a generally annular stream around nozzle 28 in a direction generally toward zone 36. This generally annular stream of gas flows around and in contact with the oxidant gas swirl vanes 46 so as to produce a swirling stream of oxidant gas as indicated. The swirling stream of oxidant gas is constricted in cross sectional flow area by refractory members 26 between oxidant gas swirl vanes 46 and nozzle outlet 30. Such constriction of the cross sectional flow area serves to further enhance turbulence of the oxidant gas stream and increase the velocity of the oxidant gas stream immediately prior to entry into zone 36. This effect further enhances combustion in zone 36.

Sour gas and acid gas are injected into respective inlets 39 and 40 as indicated at 112 and 114. In actual practice, it is typical to first start with injection of acid gas to stabilize the combustion reaction within burner tube 10, followed by injection of sour gas. Acid gas resulting from desulfurization of crude oil preferably contains at least about 90 vol. % hydrogen sulfide, only minor or trace amounts of hydrocarbons and carbon dioxide, and no ammonia. Sour gas resulting from such desulfurization preferably comprises about 20 to about 40 vol. % hydrogen sulfide, about 20 to about 40 vol. % ammonia, and about 20 to about 40 vol. % water vapor.

Referring again to FIG. 2, a flow of acid gas as indicated at 116 is established in annular space 66 so as to flow therethrough. The acid gas flows around and in contact with acid gas swirl vanes 68 so as to produce a swirling stream of acid gas. Similarly, a flow of sour gas is established through annular space 74 as indicated at 118. The stream of sour gas flows around and in contact with sour gas swirl vanes 76 so as to produce a swirling stream of sour gas within annular space 74.

Dashed arrows as denoted by reference character 120 indicate flow of fuel gas through fuel gas tube 42 when the fuel gas tube is in the extended position as shown by dashed lines. Of course, such fuel gas is not passed through fuel gas tube 42 during combustion of sour gas and acid gas.

Referring back to FIG. 1, due to the orientation of the various swirl gas vanes as has previously discussed, a swirling stream of oxidant gas having a swirling motion in a clockwise rotational direction (when facing upstream end 14) flows into zone 36, and a swirling stream of acid gas flows from nozzle outlet 30 into zone 36 so as to rotate in a counterclockwise rotational direction opposite that of the swirling stream of oxidant gas. Such opposite rotational direction of the swirling streams further enhances turbulence and mixing of the adjacent streams. In a similar manner, a swirling stream of sour gas having a clockwise rotational direction exits nozzle outlet 30 so as to flow into zone 36. The sour and acid gas streams, therefore, mix with the stream of oxidant gas in zone 36 so as to produce a combustible mixture. The hydrogen sulfide and ammonia in the sour and acid gases are accordingly combusted in zone 36 so as to produce water vapor, sulfur dioxide and nitrogen as combustion products.

In order to achieve complete combustion of the ammonia in the sour gas, it is desirable that the relative amounts of hydrogen sulfide and oxygen flowing into zone 36 allow complete combustion of all hydrogen sulfide flowing into zone 36 while leaving enough excess oxygen for combustion of the ammonia. With respect to the combination of all hydrogen sulfide, ammonia and oxygen flowing into zone 36, an example of the preferred ratio of $H_2S:NH_3:O_2$ is in the range of about 0.5:0.1:1.76 to about 0.9:0.4:2.2. A ratio in this range will achieve complete combustion of the ammonia as well as the hydrogen sulfide. Of course, if the apparatus is being used in conjunction with the Claus process, only one-third of the total hydrogen sulfide is to be combusted so as to yield a hydrogen sulfide to sulfur dioxide molar ratio of about 2:1. Therefore, only a portion of the total supply of acid gas can be injected into the illustrated apparatus, whereas the remainder of the acid gas must be introduced downstream to achieve the desired hydrogen sulfide to sulfur dioxide ratio of about 2:1. A mixture having such a ratio is conventionally cooled and passed through a catalyst to react the sulfur dioxide and hydrogen sulfide to form sulfur.

It is believed that the present invention permits complete combustion of the ammonia in contrast to prior art processes and devices due to the excellent combustion of combustible gases and oxidant gas in zone 36 and due to the preheating of the oxidant gas as previously discussed prior to its entry into zone 36. This combination of advantageous features achieves very fast and complete combustion of the hydrogen sulfide which produces the higher temperatures conducive to the complete combustion of ammonia. Such higher temperatures greatly increase the rate of reaction of ammonia with the oxidant gas.

With respect to temperature conditions in zone 36, temperatures of at least 2800° F. have been achieved and have been found to have associated therewith complete combustion of the ammonia as well as the hydrogen sulfide in a combination of sour gas and acid gas streams. It is preferred that the temperature conditions in zone 36 be in the range of about 2000° F. to about 3000° F., and most preferably in the range of about 2500° F. to about 2800° F. Temperatures above 3000° F. are not desired since these may be damaging to refractory materials within the apparatus. Temperatures below 2000° F. are not desirable because such low temperatures are not conductive to the combustion of ammonia.

A preferred residence time of the sour gas, acid gas, oxidant gas and combustion products formed therefrom in zone 36 is in the range of about 15 to about 25 milliseconds.

The resulting combustion products comprising sulfur dioxide, nitrogen and water vapor, along with possibly some excess oxidant gas, are discharged through burner tube outlet 18 and into chamber 63. The various products further mix in chamber 63 before being passed to further equipment downstream such as boilers and catalyst beds for recovering sulfur from the combustion products.

Following combustion of acid gas and sour gas using the illustrated apparatus, the fuel gas tube 42 can once again be extended into zone 36 so as to combust fuel gas for the purpose of melting out various deposits within the apparatus. The fuel gas tube is then retracted into nozzle 28 to prepare for further runs.

Thus, there is provided by the present invention a combustion apparatus and method which has been found to be particularly effective in combusting ammonia in sour gas streams. As has been explained previously, this is particularly advantageous since this decreases the amount of ammonia discharged into the atmosphere and also prevents corrosion in downstream sulfur recovery equipment.

Obviously many modifications and variations of the present invention are possible in light of the above teachings. It is therefore to be understood that within the scope of the appended claims the invention may be practiced otherwise than as specifically described.

That which is claimed is:

1. An apparatus comprising:
a first hollow member having a longitudinal axis, an interior surface, an exterior surface, at least one inlet which communicates with the interior of said hollow member, and an outlet which communicates with the interior of said hollow member and which is longitudinally spaced from said at least one inlet;
a nozzle which comprises a first tubular member and a second tubular member positioned generally coaxially within said first tubular member so as to define a first generally annular space therebetween, said nozzle having an exterior surface, an outlet and at least one combustible gas swirl vane within said nozzle, and wherein said nozzle extends into the interior of said hollow member such that said nozzle outlet is longitudinally positioned between said at least one hollow member inlet and said hollow member outlet and such that a passageway is defined through said hollow member having a first zone defined by the exterior surface of said nozzle and the interior surface of a first portion of said hollow member longitudinally extending between said at least one hollow member inlet and said nozzle outlet, said passageway further comprising a second zone defined by the interior surface of a second portion of said hollow member longitudinally extending between said nozzle outlet and said hollow member outlet;
at least one oxidant gas swirl vane fixedly mounted within said first zone;
a first directing means for directing an oxidant gas stream in a direction generally toward said at least one hollow member inlet so as to flow along and in contact with at least a portion of the exterior surface of said second portion and then along and in contact with at least a portion of the exterior surface of said first portion;
a second directing means for directing the entirety of said oxidant gas stream through said at least one hollow member inlet and into said first zone so as to flow, in a direction generally toward said second zone, around and in contact with said at least one oxidant gas swirl vane to thereby produce a swirling stream of oxidant gas;
means for passing a first combustible gas stream through said first generally annular space and a second combustible gas stream through said second tubular member so as to flow around and in contact with said at least one combustible gas swirl vane, whereby swirling first and second combustible gas streams exit said nozzle outlet into said second zone so as to contact and mix with the swirling stream of oxidant gas in said second zone.

2. An apparatus as recited in claim 1 wherein said at least one combustible gas swirl vane comprises at least one first swirl vane mounted within said first generally annular space and at least one second swirl vane mounted within said second tubular member, and wherein said at least one first swirl vane is adapted to impart a swirling motion to said first stream in a first rotational direction and said at least one second swirl vane is adapted to impart a swirling motion to said second stream in a second rotational direction opposite to said first rotational direction.

3. An apparatus as recited in claim 2 wherein said at least one first swirl vane comprises a plurality of first swirl vanes circumferentially spaced around said first generally annular space and said at least one second swirl vane comprises a plurality of second swirl vanes circumferentially spaced around the interior of said second tubular member.

4. An apparatus as recited in claim 3 wherein each of said first swirl vanes circumferentially overlaps an adjacent first swirl vane, and wherein each of said second swirl vanes circumferentially overlaps an adjacent second swirl vane.

5. An apparatus as recited in claim 4 wherein said nozzle extends generally along the longitudinal axis of said first hollow member to said nozzle outlet such that the first zone of said passageway comprises a second generally annular space.

6. An apparatus as recited in claim 5 wherein said at least one oxidant gas swirl vane comprises a plurality of oxidant gas swirl vanes circumferentially spaced around said second generally annular space, and wherein each oxidant gas swirl vane circumferentially overlaps an adjacent oxidant gas swirl vane.

7. An apparatus as recited in claim 6 wherein said plurality of oxidant gas swirl vanes are adapted to impart a swirling motion to said oxidant gas stream in said second rotational direction opposite to the first rotational direction of said first combustible gas stream.

8. An apparatus as recited in claim 7 wherein said first hollow member has a sidewall, defining the interior and exterior surfaces of said first hollow member, and a closed upstream end through which said nozzle extends into said first hollow member, said sidewall having at least one inlet of said first hollow member therethrough so as to be longitudinally positioned between said oxidant gas swirl vanes and said upstream end, wherein said first directing means includes a second hollow member having an interior surface, a first open end for receiving oxidant gas therethrough, and a second end, said second hollow member surrounding said first hollow member so as to extend from said first open end, positioned longitudinally between said nozzle outlet and the outlet of said first hollow member, to said second end which is positioned longitudinally between said upstream end and said at least one inlet of said first hollow member, and further wherein a third annular space which communicates with said at least one inlet of said first hollow member is defined between the interior surface of said second hollow member and the exterior surface of said first hollow member.

9. An apparatus as recited in claim 8 wherein said at least one inlet of said first hollow member comprises a plurality of inlets circumferentially spaced around said first hollow member.

10. An apparatus as recited in claim 9 wherein said second directing means comprises a generally annular wall at the second end of said second hollow member which closes said third generally annular space at said second end, said second directing means further comprising the upstream end of said first hollow member.

11. An apparatus as recited in claim 10 wherein, at a position longitudinally positioned between said oxidant gas swirl vanes and said nozzle outlet, said first zone converges in a downstream direction from a first cross-sectional flow area to a second cross-sectional flow area smaller that said first flow area.

12. An apparatus as recited in claim 11 wherein said apparatus further comprises: a third tubular member having an end and at least one outlet near said end, said third tubular member extending into said second tubular member so as to be coaxially positioned therein and so as to define a fourth generally annular space between said second tubular member and said third tubular member through which said second combustible gas stream is passed; and means for passing a fuel gas through said third tubular member so as to exit said at least one outlet.

13. An apparatus as recited in claim 12 wherein said third tubular member has a stop ring means associated therewith which enables selective positioning of said third tubular member between a first position, in which the end of said third tubular member is within said second tubular member, and a second position in which the end of said third tubular member and said at least one outlet are within said second zone so as to be longitudinally positioned between said nozzle outlet and the outlet of said first hollow member.

14. An apparatus as recited in claim 13 wherein said first hollow member has an open downstream end which defines the outlet of said first hollow member, and wherein said apparatus further comprises a third hollow member having a closed end, which is longitudinally positioned between the upstream end of said first hollow member and the second end of said second hollow member, through which said first hollow member extends so as to extend through the interior of said third hollow member to the downstream end of said first hollow member, said third hollow member extending downstream, with respect to said first hollow member, from the downstream end of said first hollow member, and wherein said apparatus further comprises a partition wall, having an opening therethrough, which divides the interior of said third hollow member into a first chamber which surrounds said first and second hollow members and a second chamber which communicates with the outlet of said first hollow member through said opening, said third hollow member further having an inlet communicating with said first chamber for receiving oxidant gas therethrough.

15. An apparatus as recited in claim 14 wherein said means for passing said first and second combustible gas streams is adapted to pass through said nozzle so as to exit said nozzle outlet an acid gas containing hydrogen sulfide and no ammonia as said first stream and also a sour gas containing hydrogen sulfide and ammonia as said second stream.

16. A method comprising:
(a) providing a first hollow member having a longitudinal axis, an interior surface, an exterior surface, at least one inlet which communicates with the interior of said hollow member, and an outlet which communicates with the interior of said hollow member and which is longitudinally spaced form said at least one inlet;
(b) providing a nozzle which comprises a first tubular member and a second tubular member positioned generally coaxially within said first tubular member so as to define a first generally annular space therebetween, said nozzle having an exterior surface, an outlet, and at least one combustible gas swirl vane within said nozzle, and wherein said nozzle extends into the interior of said hollow member such that said nozzle outlet is longitudinally positioned between said at least one hollow member inlet and said hollow member outlet and such that a passageway is defined through said hollow member having a first zone defined by the exterior surface of said nozzle and the interior surface of a first portion of said hollow member longitudinally extending between said at least one hollow member inlet and said nozzle outlet, said passageway further comprising a second zone defined by the interior surface of a second portion of said hollow member longitudinally extending between said nozzle outlet and said hollow member outlet;
(c) providing at least one oxidant gas swirl vane fixedly mounted within said first zone;
(d) directing an oxidant gas stream in a direction generally toward said at least one hollow member inlet so as to flow along and in contact with at least a portion of the exterior surface of said second portion and then along and in contact with at least a portion of the exterior surface of said first portion;
(e) directing the entirety of said oxidant gas stream through said at least one hollow member inlet and into said first zone so as to flow, in a direction generally toward said second zone, around and in contact with said at least one oxidant gas swirl vane to thereby produce a swirling stream of oxidant gas;
(f) passing a first combustible gas stream through said first generally annular space and a second combustible gas stream through said second tubular member so as to flow around and in contact with said at least one combustible gas swirl vane, whereby swirling first and second combustible gas streams exit said nozzle outlet into said second zone so as to contact and mix with the swirling stream of oxidant gas in said second zone;

(g) combusting said first and second combustible gas streams in said second zone to thereby produce combustion products;

(h) discharging said combustion products through said hollow member outlet.

17. A method as recited in claim 16 wherein said at least one combustible gas swirl vane comprises at least one first swirl vane mounted within said first generally annular space and at least one second swirl vane mounted in said second tubular member, and wherein in step (f) said first combustible gas stream flows around and in contact with said at least one first swirl vane and said second combustible gas stream flows around and in contact with said at least one second swirl vane.

18. A method as recited in claim 17 wherein said swirling first combustible gas stream has a swirling motion associated therewith in a first rotational direction and wherein said swirling second combustible gas stream has a swirling motion associated therewith in a second rotational direction opposite to said first rotational direction.

19. A method as recited in claim 18 wherein said swirling stream of oxidant gas has a swirling motion with a rotational direction opposite to the rotational direction of said first combustible gas stream.

20. A method as recited in claim 19 wherein said nozzle extends generally along said longitudinal axis to said nozzle outlet such that said first zone comprises a second generally annular space, said at least one oxidant gas swirl vane being mounted within said second annular space, and further wherein in step (e) said oxidant gas stream flows through said second generally annular space in a generally annular stream around said nozzle.

21. A method as recited in claim 20 wherein in step (d) said oxidant gas stream flows in a generally annular stream around at least a portion of the first portion of said first hollow member and around the second portion of said first hollow member.

22. A method as recited in claim 21 wherein oxidant gas flowing through said second generally annular space between said at least one oxidant gas swirl vane and said nozzle outlet is constricted in cross-sectional flow area.

23. A method as recited in claim 22 wherein said method further comprises the following steps which are carried out before step (d) or after step (h): extending a third tubular member, having an end with at least one outlet near said end, through the interior of said second tubular member so that the end of said third tubular member and said at least one outlet are within said second zone so as to be positioned longitudinally between said nozzle outlet and the outlet of said first hollow member; passing a fuel gas through said third tubular member so as to exit said at least one outlet into said second zone; combusting said fuel gas in said second zone; and then retracting said third tubular member to a position in which the end of said third tubular member and said at least one outlet is within said second tubular member.

24. A method as recited in claim 23 wherein said acid gas comprises at least about 90 vol. % hydrogen sulfide and said sour gas comprises about 20 to about 40 vol. % hydrogen sulfide, about 20 to 40 vol. % ammonia, and about 20 vol. % to about 40 vol. % water vapor.

25. A method as recited in claim 24 wherein the temperature conditions in said second zone are in the range of about 2000° F. to about 3000° F. during step (g).

26. A method as recited in claim 25 wherein said first hollow member has an open downstream end which defines the outlet of said first hollow member, said outlet communicating with a chamber which is at least partially defined by a wall connected to said first hollow member at said downstream end, wherein the combustion products discharged through the outlet of said first hollow member in step (h) flow into said chamber, and further wherein said method further comprises the step of directing said oxidant gas stream, immediately before step (d), along a surface of said wall.

27. A method as recited in claim 23 wherein said first combustible gas stream comprises an acid gas stream containing hydrogen sulfide and no ammonia and said second combustible gas stream comprises a sour gas containing hydrogen sulfide and ammonia.

* * * * *